United States Patent [19]
Dirkse et al.

[11] Patent Number: 5,106,240
[45] Date of Patent: Apr. 21, 1992

[54] AERATED DISCHARGE DEVICE

[75] Inventors: Hendricus A. Dirkse, The Hague, Netherlands; Andrew M. Scott, Ince (nr Chester), England; Thomas S. Dewitz, Houston, Tex.; Rene Rombout, Houston, Tex.; Charles M. Arbore, Houston, Tex.; Uday Mahagaokar, Houston, Tex.; Rudi Everts, The Hague, Netherlands

[73] Assignee: Shell Oil Company, Houston, Tex.

[21] Appl. No.: 209,602

[22] Filed: Jun. 21, 1988

[51] Int. Cl.$^5$ ............... B65G 53/38; B65G 53/40
[52] U.S. Cl. ............... 406/138; 406/90; 406/91; 222/195
[58] Field of Search ............... 406/136–138, 406/89–91, 146; 222/195; 366/101, 106, 107

[56] References Cited

U.S. PATENT DOCUMENTS

| | | |
|---|---|---|
| 699,405 | 5/1902 | Newhouse . |
| 2,115,023 | 4/1938 | Kennedy et al. . |
| 2,170,258 | 8/1939 | Borch ............... 406/136 X |
| 2,400,194 | 5/1946 | Day et al. ............... 196/52 |
| 2,499,766 | 3/1950 | MacLeod . |
| 2,568,379 | 9/1951 | Berg ............... 183/4.2 |
| 2,631,759 | 3/1953 | Hoopes ............... 222/193 |
| 2,708,602 | 5/1955 | Galle ............... 406/90 |
| 2,715,551 | 8/1955 | Kiernan . |
| 2,794,686 | 1/1957 | Anselman et al. . |
| 2,806,781 | 9/1957 | Shepherd et al. ............... 75/53 |
| 3,001,829 | 9/1961 | Saint-Martin . |
| 3,007,744 | 11/1961 | Ward et al. . |
| 3,121,593 | 2/1964 | McIlvaine . |
| 3,159,432 | 12/1964 | Ostrowski et al. . |
| 3,188,144 | 6/1965 | Gmür et al. ............... 406/90 X |
| 3,230,016 | 1/1966 | Gilbert et al. . |
| 3,237,812 | 3/1966 | Kemp ............... 406/91 |
| 3,285,739 | 11/1966 | Christensen ............... 75/130 |
| 3,289,396 | 12/1966 | Anderson ............... 406/138 X |
| 3,301,604 | 1/1967 | Berry ............... 406/138 X |
| 3,367,724 | 2/1968 | Emery et al. . |
| 3,379,345 | 4/1968 | Gehrung ............... 406/90 |
| 3,411,832 | 11/1968 | Garreau et al. . |
| 3,424,352 | 1/1969 | Schlink ............... 222/195 |
| 3,479,093 | 11/1969 | Hale . |
| 3,693,839 | 9/1972 | Shaver et al. ............... 406/138 X |
| 3,720,351 | 3/1973 | Coulter et al. ............... 222/1 |
| 3,822,919 | 7/1974 | Strom . |
| 3,994,702 | 11/1976 | Schweimanns et al. . |
| 4,018,588 | 4/1977 | Hardy ............... 65/19 |
| 4,049,394 | 9/1977 | Gernhardt et al. ............... 48/62 R |
| 4,067,623 | 1/1978 | Klein et al. . |
| 4,280,782 | 7/1981 | Stumpf ............... 406/89 X |
| 4,381,898 | 5/1983 | Rotolico et al. ............... 406/138 X |
| 4,381,924 | 5/1983 | Schmidt ............... 48/197 R |
| 4,482,275 | 11/1984 | Shinozaki et al. ............... 406/12 |
| 4,529,336 | 7/1985 | Shinozaki et al. ............... 406/14 |

FOREIGN PATENT DOCUMENTS

| | | |
|---|---|---|
| 681824 | 3/1964 | Canada ............... 406/138 |
| 1141588 | 12/1962 | Fed. Rep. of Germany ............... 406/89 |
| 98030 | 7/1980 | Japan . |
| 102431 | 6/1982 | Japan . |
| 107316 | 7/1982 | Japan . |
| 6617838 | 6/1967 | Netherlands ............... 406/90 |

OTHER PUBLICATIONS

Monitor Manufacturing, Aeration Products Group—"Monitor Aeration Devices" (Sales brochure—no date available).

*Primary Examiner*—Margaret A. Focarino
*Assistant Examiner*—James M. Kannofsky

[57] ABSTRACT

The invention is directed to a method and apparatus for establishing and maintaining a uniform mass flow rate of particulate solids and gas mixture from a container to a receiving reactor. A preferred embodiment utilizes a plurality of porous inserts in the walls of the container through which a gaseous fluid is forced thereby contacting particulate solids within said container and enhancing the flow of said solids.

33 Claims, 3 Drawing Sheets

U.S. Patent Apr. 21, 1992 Sheet 1 of 3 5,106,240
FIG.1
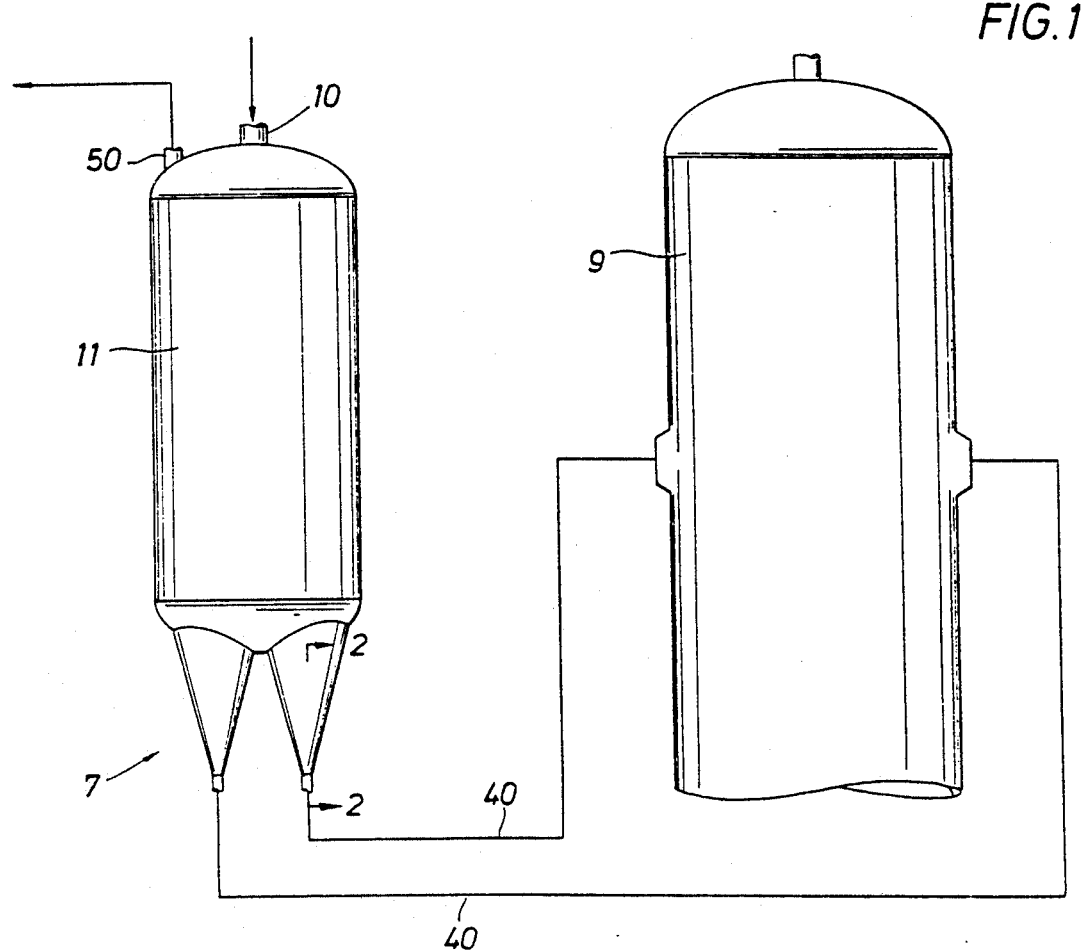
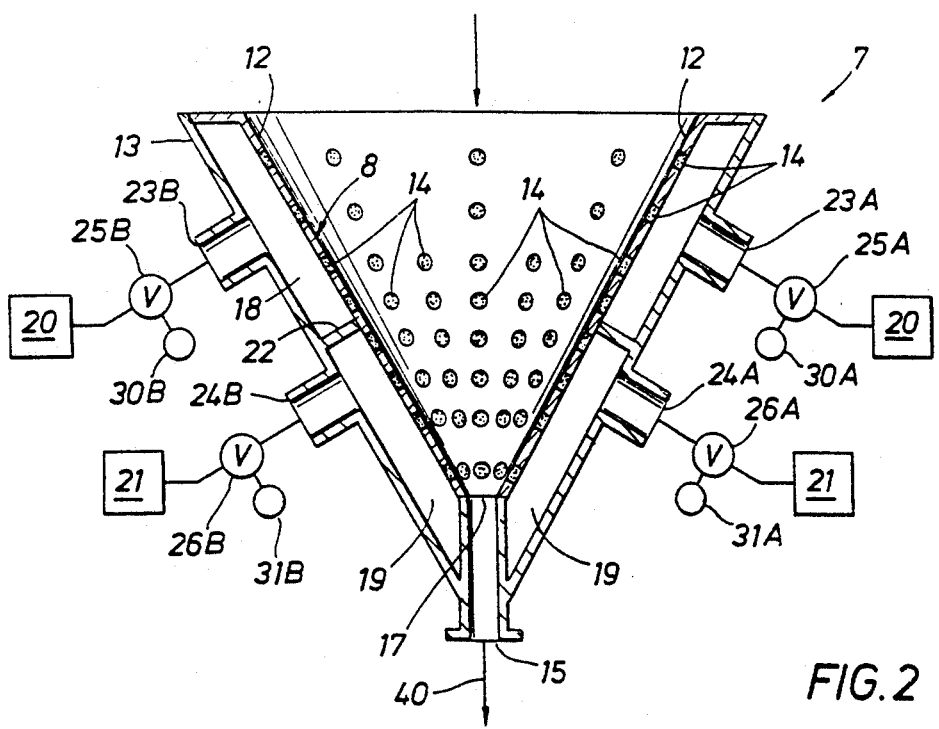
FIG.2

AERATED DISCHARGE DEVICE

RELATED APPLICATIONS

This invention is related to Assignee's patent applications Ser. No. 07/355,860 filed on May 18, 1989, now U.S. Pat No. 4,941,779 which is a continuation of Ser. No. 07/098,161, filed on Sep. 18, 1987, now abandoned, Ser. No. 07/098,588 filed on Sep. 18, 1987, now U.S. Pat. No. 4,830,545, and Ser. No. 07/098,178 filed on Sep. 18, 1987, now U.S. Pat. No. 4,853,003, and to Ser. No. 07/209,603 filed on Jun. 21, 1988.

BACKGROUND OF THE INVENTION

Conventional coal feed systems using gravity flow of solids, such as in a coal feed to coal-fired boilers, tolerate major fluctuations in the coal mass flow rate and suspension density.

Various devices have been built for discharging substances which tend to flow easily by gravity, such as grain. While devices such as those described in U.S. Pat. Nos. 3,289,396, 3,367,724, 4,529,336, 3,424,352, and 4,067,623 are concerned with providing "efficient discharge" of particulate materials from bulk storage tanks and avoiding bridging and incomplete discharging from such tanks, these devices do not maintain a uniform mass flow rate of particulate solids and gas mixture discharged in a uniform manner to a receiving reactor.

The present invention is directed to overcoming this problem in the art both for uniform flow and for reliable continuous flow.

Applicants are not aware of any prior art which, in their judgment as persons skilled in this particular art, would anticipate or render obvious the present invention. However, for the purpose of fully developing the background of the invention, and establishing the state of requisite art, the following art, in addition to Assignee's above-identified related applications, is set forth: U.S. Pat. Nos. 4,482,275; 3,367,724; 4,067,623; 3,424,352; 4,529,336; Re 24,716 (2,794,686); 3,007,744; 2,568,379; 2,400,194; 2,115,023; 3,230,016; 3,285,739; 3,289,396; 4,381,924; 3,479,093; 3,121,593; 3,159,432; 2,499,766; 3,411,832; 3,720,351; 2,806,781; 3,822,919; 699,405; 3,994,702; 4,018,588; 3,001,829; 2,715,551; 2,631,759; Japanese patents 98,030; 102,431; and 107,316; "Monitor Aeration Devices", Monitor Manufacturing Company, Elburn, Ill. 60119.

SUMMARY OF THE INVENTION

The invention relates to a high pressure, variable temperature, reliable, relatively dry coal feed system.

The primary purpose of the present invention relates to maintaining a uniform mass flow rate of particulate solids and gas mixture discharged, under high temperature and pressure conditions, to a receiving reactor. In particular, this invention relates to pulverized coal discharged to a gasifier for the manufacture of synthesis gas.

Preferably, such an apparatus includes: means for introducing the mixture into a first containing means having converging walls at the lower end, a portion of which is made of porous material, the containing means having at least one port formed at the apex thereof for discharging the mixture therefrom, means for isolating areas outside the porous material portion of the first containing means to form one or more substantially closed compartments, means for selectively injecting gaseous fluid under pressure into the mixture via said compartments, and means for discharging the particulate solids from the first containing means.

Preferably, a method for controlling mass flow rate of solids to a reactor includes: introducing the mixture into a first containing means having converging walls forming a portion made partially of porous material, the containing means having at least one port formed at the apex thereof for discharging the mixture therefrom, isolating areas outside the porous material portion of the first containing means to form one or more substantially closed compartments; selectively injecting gaseous fluid under pressure into the compartments, and discharging the particulate solids from the first containing means.

The various features of novelty which characterize the invention are pointed out with particularity in the claims forming a part of this disclosure. For a better understanding of this invention, its operating advantages and specific objectives obtained by its uses, reference may be made to the accompanying drawings and descriptive matter in which there are illustrated preferred embodiments of the invention.

BRIEF DESCRIPTION OF THE DRAWINGS

FIG. 1 illustrates a coal gasification system employing an embodiment of this invention.

FIG. 2 is a cross-section of the preferred embodiment taken along line 2—2 of FIG. 1.

DESCRIPTION OF A PREFERRED EMBODIMENT

Figure 3:
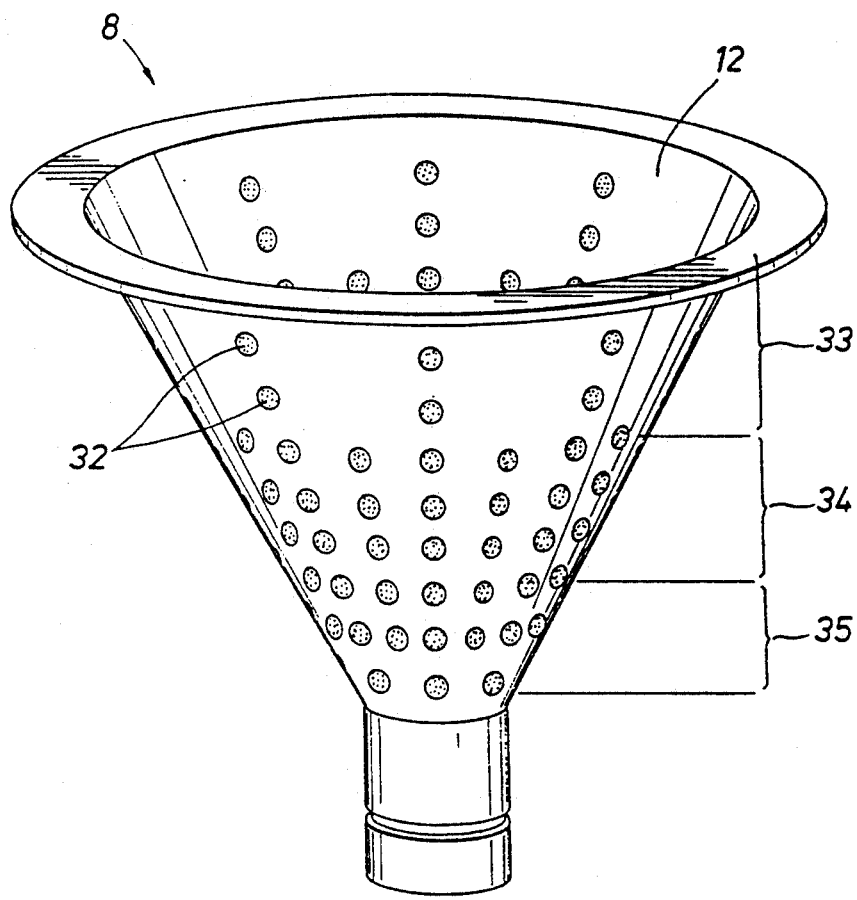
FIG. 3 is an isometric view of the linear of the preferred embodiment of the present invention.

Generation of synthesis gas occurs by partially combusting a carbonaceous fuel, such as coal, at relatively high temperatures in the range of 1000° C.–3000° C. and at a pressure range of from about 1–200 bar, in the presence of oxygen or oxygen-containing gases in a coal gasification reactor, hereinafter referred to as a gasifier. Steam, carbon monoxide, carbon dioxide and oxygen-containing gases including air, oxygen-enriched air, and oxygen are optionally diluted with nitrogen and/or other inert gases.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions, but this is not required for this invention. Generally, the burners have their discharge ends positioned to introduce the resulting flame and the agent of combustion into the gasifier.

Of particular importance in the manufacture of synthesis gas is the uniform manner in which the particulate fuel is introduced to the burners while the gasifier. Fluctuations in the mass flow rate of coal being applied to the burners of a gasifier are detrimental to the gasifier's performance. What is needed is a reliable, uniform flow of coal having fluctuations less than 1–2% at a frequency range of 0.01–100 Hz. For example, such fluctuations can cause inefficient combustion of fuel within the gasifier and damaging heat fluxes to the burner face which could result in thermal stresses on the burner face. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, localized high temperatures in the gasifier could damage the refractory lining which is normally arranged at the inner surface of the gasifier wall.

Since the residence time of the coal within the reaction zone of the reactor is approximately 5 seconds or less, the coal mass flow rate should preferably be constant over periods of this order and preferably over shorter periods to maintain constant local conditions.

Various factors substantially effect the mass flow rate of the fuel being supplied to the burners. In particular, the discharging of the particulate fuel from a feed vessel apparatus and the transporting by conduit of the fuel from the vessel to the gasifier affect the mass flow rate of fuel to the gasifier. Specifically, fuel and gas mixtures having densities ranging from about 50–800 kg/m$^3$ transported through a conduit having a diameter less than 150 mm experience significant pressure drop due to the summation of various contributions such as frictional losses, restrictions, curvatures, etc. within the conduit.

The present invention utilizes a vessel having downwardly-converging walls at the lower end thereof forming a portion having plugs of porous material for aerating the solids within the vessel, and having at least one port at the apex so as to maintain a uniform mass flow rate of the solids and gas mixture discharged to a gasifier. In particular, areas located circumferentially about the outside of the porous material portion are isolated to form one or more closed compartments. Gaseous fluids are injected into each compartment at selected pressure and rate to maintain a uniform mass flow rate of a particulate solids and gas mixture to be discharged to the receiving gasifier. Furthermore, the interchangeability of porous material portions having different permeabilities provide greater flexibility for operating the process under varying conditions, such as different coal types, coal moisture content, etc. A typical pattern of plug configuration is shown in FIG. 2. This configuration can be changed depending on the solids flow characteristics and properties.

An advantage of the present invention is that maintaining a uniform mass flow rate of a particulate solids and gas mixture to a gasifier prevents the occurrence of zones of underheating and overheating within the gasifier.

A further advantage of the present invention is the protection afforded the refractory lining within the gasifier due to the prevention of zones of underheating and overheating.

An additional advantage of the present invention is more efficient utilization of fuel in the production of synthesis gas.

Another advantage of the present invention is the capability of maintaining high suspension densities. e.g. greater than 50 to 800 kg/m$^3$, in the transport line from the vessel to the gasifier thereby reducing the consumption of aeration and pneumatic transport gas and avoiding dilution of the synthesis gas produced in the gasifier which would make the synthesis gas a less valuable product.

Although the invention is described hereinafter primarily with reference to pulverized coal, the method and apparatus according to the invention are also suitable for reactive solids and other finely divided solid fuels which could be partially combusted, such as lignite, anthracite, bituminous, brown coal, soot, petroleum coke, shale, tar sands, and the like. Preferably, the size of solid carbonaceous fuel is such that 90 percent by weight of the fuel has a particle size smaller than 100 mesh (A.S.T.M.).

Additionally, the present invention can be used for both granular, pulverized, and powdered solids such as resins, catalysts, fly ash, and electrostatic precipitator fines, and the like.

Having thus generally described the apparatus and method of the present invention, as well as its numerous advantages over the art, the following is a more detailed description thereof, given in accordance with specific reference to the drawings. However, the drawings are of a process flow type in which auxiliary equipment, such as pumps, compressors, cleaning devices, etc. are not shown. All values are merely exemplary or calculated.

Referring to FIG. 1, an apparatus for maintaining a uniform mass flow rate of a particulate solids and gas mixture discharged from a holding vessel apparatus, such as a feed hopper 11 operated at elevated pressures of 1-200 bar, via conduit 40 to a receiving reactor, such as a gasifier 9, generally includes means for introducing the mixture, such as an inlet port 10, into the feed hopper 11. The feed hopper 11 directs the material into generally cone-shaped receiving means shown generally at 7 and described more particularly with reference to FIG. 2.

Referring now to FIG. 2, the receiving means 7 may be lined with a liner or inner shell 8 to be more particularly described with reference to FIG. 3. The liner 8 has converging walls 12 forming an included angle of less than about 150 degrees, preferably less than about 90 degrees, and converging toward at least one port 17 formed at the apex thereof for discharging the mixture therefrom.

The receiving means 7 comprises a jacket 13 which surrounds the line 8 and is mounted to form a substantially enclosed space, or manifold, between the walls 12 of the liner 8 and the jacket 13. The jacket 13 has at least one outlet port 15 at the lower end thereof which is in axial alignment with the discharge port 17 of the liner 8 for discharging particles therefrom.

Means for isolating areas, preferably first and second areas 18, 19, respectively, located outside and circumferentially about substantially adjacent portions of porous plugs 14 of walls 12, such as a partition 22 within the substantially enclosed space between the jacket 13 and the walls 12, forms at least two substantially enclosed compartments. The jacket 13 includes means for selectively injecting gaseous fluid under pressure into first and second areas 18, 19, respectively, such as inlet ports 23A, 23B, and 24A, 24B, respectively, from pressurized fluid sources 20, 21 respectively. Although sources 20, 21 are shown as separate sources, it is recognized by those skilled in the art that gaseous fluid may be supplied from the same source.

The compartments formed within the substantially enclosed space between the walls 12 and the jacket 13 permit gaseous fluids, possibly having different densities, such as nitrogen or other inert gas and synthesis gas which is mainly carbon monoxide, hydrogen, and water, to be selectively injected into the compartments. The gas injected from source 20 into the first area 18 may be more, equal, or less dense than the gas injected from source 21 into second area 19. Preferably, the gas injected into area 18 would be inert and the gas injected into area 19 would be particulate-free synthesis gas. The gas injected into area 18 would preferentially flow upwards and could be vented to control the pressure in the feed hopper 11 whereas the gas injected into area 19 would preferentially downward and is transported to the gasifier 9.

Referring now to FIG. 3, the liner 8 is preferably made of a heavy, solid material such as stainless steel or alloy-20 and contains a plurality of holes such as 32 in the walls 12. The holes 32 are countersunk to receive and retain plugs shown generally at 14 of FIGS. 2, 3A and 3B. The plugs 14 are comprised of inserts 16 made of porous material which may be metallic or nonmetallic, such as sintered powdered metal, woven stainless steel, or porous ceramic, depending upon the operating conditions and type of coal used in the process. Inserts 16 are held in place by means of a retainer ring 27 which also allows for differential thermal expansion. The porous material of insert 16 has a selected permeability preferably in the range of 0.01 to 10 acfm/ft$^2$-psi. The porous material of the insert 16 facilitates the uniform distribution of gaseous fluid injected from pressurized sources 20, 21 into the liner 8 and prevents bridging of the particulate solids discharged from the liner 8 via discharge port 17.

The pore size of the porous material and the type of pourous material of the insert 16 is based on, among other factors, the type of coal or fuel used and the temperature of operation. To allow greater operating flexibility to use various types of coal requiring different pore sizes, the liner 8 is preferably interchangeable with another liner having plugs 14 of a different permeability than the first liner 8.

Sufficient pressure drop over each plug should be maintained to ensure uniform flow over all the plugs.

Furthermore, introduction of the gaseous fluid into the pores of the porous material of the insert 16 imparts a pressure restriction to the gaseous fluid thus ensuring an even flow distribution of the fluid throughout the plugs 14 of the walls 12 of the liner 8. Similarly, the porous material serves to control the bulk density of the mixture within the liner 8 and the discharge rate of the mixture leaving the hopper 11 via port 17.

Figure 3A:
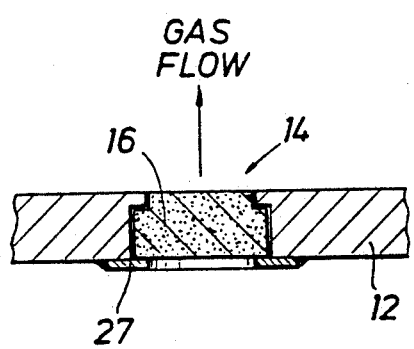
FIGS. 3A and 3B are sectional views of the porous plugs of FIGS. 2 and 3.
Figure 3B:
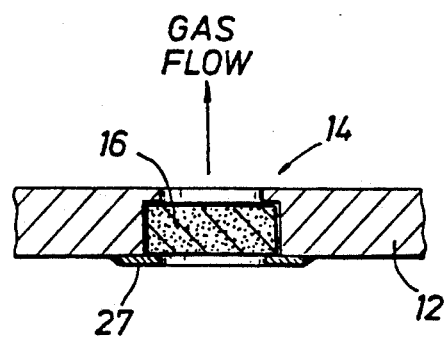

The configuration of the insert 16 of FIG. 3A presents a smoother surface of the particulate solids whereas the configuration of 3B is simpler from a manufacturing standpoint.

The holes 32 (and plugs 14) are arranged to provide proper aeration for differing particulate matter and characteristics thereof. For example, the holes 32 of the liner 8 may be arranged in three general zones of openness, 33, 34, and 35, where the zone 33 is 3% open, the zone 34 (bridging zone) is 10% open and the zone 35 is 5% open. The entire liner 8 may have approximately 200 holes 32 the diameter of each being on the order of 140 mm. The size of the plugs, configuration of the plugs and mechanical sealing depend also on the mechanical strength criteria, which are related to operating conditions.

The flow rate and direction of the gaseous fluid, preferably nitrogen and synthesis gas, injected under pressure into the first and second areas 18, 19, respectively, are controlled by using flow controllers 25A, 25B, 26A, and 26B, respectively, at a rate sufficient to aerate the particulate solids in proximity to the plugs 14 of walls 12, but at a rate below that which would fluidize the particulate solids located above the plugs 14. It is undesirable to inject the gases at a rate sufficient to fluidize the particulate above the inserts 16 as is typically done in conventional systems, because it results in more inert gas diluting the synthesis gas produced in the gasifier 9 and thus yielding a less valuable product. The flow rate over the cone in terms of permeability amounts typically to about 0.01 to 4 acfm/ft$^2$-psi.

The slip velocity above the aeration cone 8, i.e., the relative superficial velocity between the gas and the coal within the hopper, should be less than 50% of the fluidization velocity and preferably near zero. Also, fluidization of the particles increases fluctuations of the mass flow rate of solids discharged from the coal feed hopper 11.

Additionally, the flow rates of the gaseous fluid from sources 20, 21 should not exceed the terminal falling velocity of the solids contained within the feed hopper 11. Terminal falling velocity is defined as the velocity at which the drag forces on a solid particle due to the flow of gases upward equals the downward force on the particle due to gravity. If the flow rates of the gases exceed the terminal falling velocity, then the solids will be discharged via the vent 50 rather than the discharge port 17.

Preferably, the flow rates of these gases from sources 20 and 21 are independently controllable which permits the separate control of the amount of gas flowing upward and the amount of gas flowing downward relative to the flow of the coal.

For example, for a uniform mass flow rate of particulate solids and gas mixture of 2000 kg/hr having a suspension density of 450 kg/m$^3$ discharged from the feed hopper 11, the rate of injecting nitrogen in the first area would be approximately 100 kg/hr. Should this rate be exceeded then the suspension density would be less than 450 kg/m$^3$ and the synthesis gas produced in the gasifier 9 would be diluted by the nitrogen from source 20. Additionally, should this rate be somewhat less than the selected rate then the suspension density would be substantially higher than 450 kg/m$^3$. Depending on the material and operating conditions, this situation could lead to less than stable flow.

Furthermore, the gaseous fluid may be injected in various directions and elevations to control the pressure and velocity profile which exists at the discharge port 17. Depending on the physical properties of the particles being transported, it may be necessary to have more than two compartments or to inject gas above the compartmented region.

This selective injection provides for separate control of the mixture density within the feed hopper 11 and the discharge density of the mixture leaving the hopper 11 via outlet port 15. As a result, the discharge port 15 of the hopper 11 is much smaller than conventional technologies for suspension densities of 200-500 kg/m$^3$ preferred in the present invention.

The diameter of the discharge port 17 in the present invention is about 4 mm to about 150 mm for a solid and gas mixture having a suspension density of about 200-500 kg/m$^3$. This diameter is larger than the maximum bridging diameter of the aerated particulate solids to prevent bridging of the solids as they exit the discharge port 17. Conventional coal feed systems using gravity flow of solids assisted by aeration to break up bridging typically have a suspension density of less than 200 kg/m³ at the discharge outlet of the feed hopper and a corresponding feed vessel apparatus discharge port diameter of greater than about 150 mm. Diameters of the discharge port 17 greater than about 150 mm for a given mass flow rate used in the present invention are not desirable because either the velocity or suspension density would fall below the desired limits thus resulting in fluctuations of the mass flow rate of the coal and gas mixture to the gasifier 9.

Additionally, the smaller discharge port 17 diameter of the present invention, in conjunction with the compartmented injection of gaseous fluids, acts like a fluidic valve to control the particulate discharge rate and thereby eliminates the need for troublesome valves in transport hardware between the discharge of the hopper 11 and the gasifier 9.

Furthermore, the present invention may be provided with means for venting gas from the upper end of the hopper 11, say via port 50, for the purpose of maintaining an upward flow of gas through the solids in the feed hopper 11 of approximately 2 mm/sec and thereby eliminate local bridging of the solids and provide smoother flow to the discharge port 17.

Figure 4:
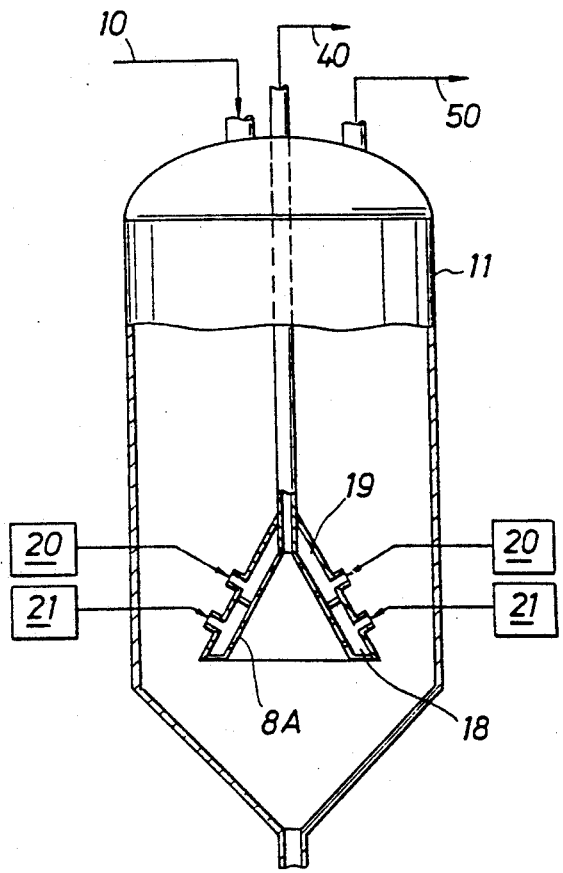
FIG. 4 is an alternate embodiment of the present invention.
Figure 5:
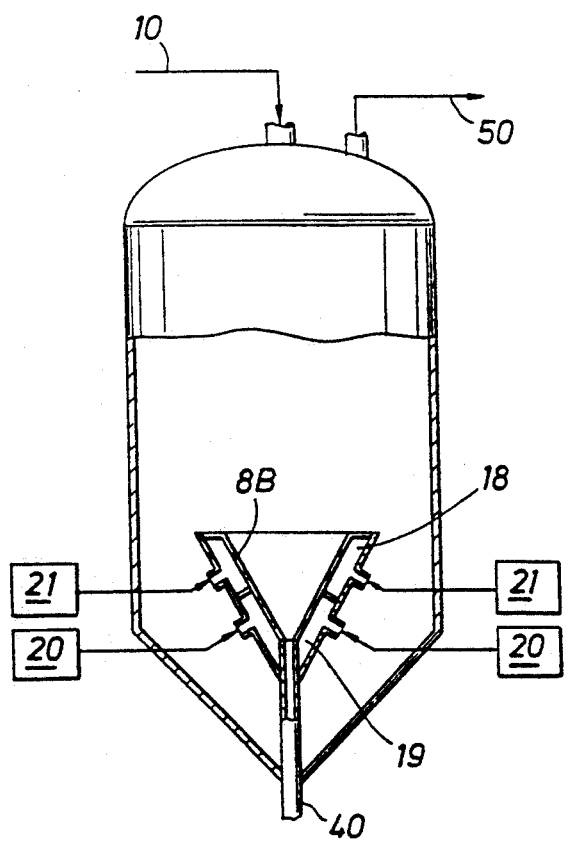
FIG. 5 is a preferred alternate embodiment of the present invention.

Alternatively, the present invention may incorporate liners 8A and 8B located inside the feed hopper 11, rather than at the lower end of the hopper 11, as shown in FIGS. 4 and 5, respectively. An advantage to the embodiment shown in FIG. 4 is that the transport line 40 from the feed hopper 11 to the gasifier 9 would be shorter for plant configurations in which the burners of the gasifier are elevated with respect to the feed hopper. A shorter transport line 40 provides more uniform flow of the coal to the burners of the gasifier 9.

Another advantage of the alternate embodiments shown in FIGS. 4 and 5, for the multiple outlet feed hopper 11, is that the geometry of the hopper 11 is substantially simplified as a result of the liners 8A and 8B being located inside the hopper 11.

It would be recognized by one skilled in the art that references made with respect to the direction of flow of the gases and coal particles within the liner 8 of the embodiment described in FIG. 1 would be reversed when referring to the liner 8A shown in FIG. 4 since the liner 8A is inverted with respect to the first containing means 7 and liner 8 shown in FIG. 2.

The foregoing description of the invention is merely intended to be explanatory thereof, and various changes in the details of the described method and apparatus may be within the scope of the appended claims without departing from the spirit of the invention.

What is claimed is:

1. A method for maintaining a uniform mass flow rate of a particulate solids and gas mixture discharged from a holding vessel apparatus to a receiving reactor, said method comprising the steps of:
    introducing said mixture into a containing means, said containing means having perforated converging walls, at least a portion of which includes porous plugs inserted in perforations therein, and at least one port formed at the apex thereof for discharging said mixture therefrom;
    isolating the area outside the porous plug portion of said containing means to form a substantially closed compartment;
    selectively injecting gaseous fluid under pressure into said compartment; and
    discharging said particulate solids from said containing means.

2. The method of claim 1 further including the steps of venting gas from said holding vessel apparatus.

3. The method of claim 1 wherein said isolating includes the steps of:
    isolating a first compartment located circumferentially about a portion of said porous plugs; and
    isolating a second compartment located circumferentially about a substantially adjacent portion of said porous plugs and below said first compartment.

4. The method of claim 3 wherein said selectively injecting gaseous fluid includes providing gaseous fluids having different densities.

5. The method of claim 4 wherein said injecting gaseous fluids includes the steps of:
    injecting a first gaseous fluid having a selected density into said first compartment; and
    injecting a second gaseous fluid having a density less than said first gaseous fluid into said second compartment.

6. The method of claim 4 wherein said injecting said gaseous fluids includes the steps of:
    injecting a first gaseous fluid having a selected density in said first compartment; and
    injecting a second gaseous fluid having a density greater than said first gaseous fluid into said second compartment.

7. The method of claim 6 further includes the step of injecting said first gaseous fluid at a selected rate not to exceed the terminal falling velocity of the solids within said holding vessel apparatus.

8. The method of claim 6 further including the step of injecting said second gaseous fluid at a selected rate not to exceed the terminal falling velocity of the solids within said holding vessel apparatus.

9. The method of claim 6 further including the step of controlling the slip velocity of said gaseous fluid under pressure at a rate below the minimum fluidization velocity of said particulate solids within said holding vessel apparatus and above the porous portion thereof.

10. The method of claim 9 wherein said controlling includes maintaining a slip velocity of at least about 2 mm/s within said holding vessel apparatus and wherein said holding vessel apparatus has a diameter of about 1 meter.

11. An apparatus for maintaining a uniform mass flow rate of particulate solids and gas mixture discharged from a holding vessel apparatus to a receiving reactor, said apparatus comprising:
    means for introducing said mixture into a containing means having perforated walls which converge to form at least one port at the apex thereof for discharging said mixture therefrom;
    a plurality of plugs mounted in said perforations of said walls, said plugs being porous to gaseous fluids and wherein one face of each of said plugs is exposed to said particulate solids;
    means for isolating the area outside said porous plug material portion of said containing means to form a substantially closed compartment;
    means for selectively injecting gaseous fluid under pressure into said compartment; and
    means for discharging said particulate solids from said containing means.

12. The apparatus of claim 11 further including means for maintaining a volume of solids and gas mixture within said holding vessel apparatus of at least about 50 percent by volume of said holding vessel apparatus.

13. The apparatus of claim 11 further including means for venting gas from said holding vessel apparatus.

14. The apparatus of claim 11 wherein said plugs are arranged in zones of openness of said containing means.

15. The apparatus of claim 11 further including separating means for dividing said compartment into a plurality of substantially closed compartments.

16. The apparatus of claim 15 wherein said means for separating includes:
   means for isolating a first compartment located circumferentially about a portion of said porous plugs; and
   means for isolating a second compartment located circumferentially about a substantially adjacent portion of said porous plugs and below said first compartment.

17. The apparatus of claim 11 wherein said gaseous fluid includes more than one component, said components being of different densities.

18. The apparatus of claim 17 wherein said means for injecting gaseous fluids includes:
   means for injecting a first gaseous fluid having a selected density into said first compartment; and
   means for injecting a second gaseous fluid having a density less than said first gaseous fluid into said second compartment.

19. The apparatus of claim 17 wherein said means for injecting said gaseous fluids includes:
   means for injecting a firs gaseous fluid having a selected density into said first compartment; and
   means for injecting a second gaseous fluid having a density greater than said first gaseous fluid into said second compartment.

20. The apparatus of claim 19 further including means for injecting said second gaseous fluid at a selected rate not to exceed the terminal falling velocity of the solids within said holding vessel apparatus.

21. The apparatus of claim 19 further including means for injecting said first gaseous fluid at a selected rate not to exceed the terminal falling velocity of the solids within said holding vessel apparatus.

22. The apparatus of claim 21 further including means for controlling the slip velocity of said gaseous fluid under pressure at a rate below the minimum fluidization velocity of said particulate solids within said holding vessel apparatus above the porous plug portion thereof.

23. The apparatus of claim 22 wherein said means for controlling includes means for maintaining a velocity of at least about 2 mm/s within said holding vessel apparatus and wherein said holding vessel apparatus has a diameter of about 1 meter.

24. An apparatus for maintaining a uniform mass flow rate of particulate solids and gas mixture discharged from a holding vessel apparatus to a receiving reactor, said apparatus comprising:
   containing means having converging walls wherein said walls converge toward at least one port formed at the apex thereof for discharging said solids and gas mixture therefrom;
   a plurality of plugs mounted in said walls, said plugs being porous to gaseous fluid and wherein one face of said plugs is exposed to said particulate solids;
   a jacket positioned at the lower end of said containing means and mounted to form a substantially enclosed space between said containing means and said jacket, said jacket having at least one outlet port at the lower end thereof in axial alignment with the discharge port of said containing means; and
   means for independently controlling the flow rate and direction of said gaseous fluid under pressure at a rate sufficient to fluidize the particulate solids in proximity to said portion of porous plugs but at a rate below that which would fluidize the particulate solids located above said porous plugs.

25. The apparatus of claim 24 wherein the selected permeability of said porous material is between about 0.01 and about 10 acfm/ft$^2$-psi.

26. The apparatus of claim 24 wherein the diameter of a portion above a region where gas is injected into said first containing means is at least substantially equal to the maximum bridging diameter of said particulate solids.

27. The apparatus of claim 24 wherein the diameter of said discharge port is about 4 mm to at least about 150 mm for a solids and gas mixture having a suspension density of about 50–800 kg/m$^3$.

28. The apparatus of claim 24 wherein the included angle of said converging walls is less than about 150 degrees.

29. The apparatus of claim 24 wherein said containing means is interchangeable with a second containing means having different permeabilities than said first containing means.

30. The apparatus of claim 24 wherein said plugs are arranged in zones of openness of said containing means.

31. The apparatus of claim 24 wherein said substantially enclosed space is divided into a plurality of substantially enclosed compartments.

32. The apparatus of claim 31 wherein said jacket includes means for injecting said gaseous flow into each of said compartments.

33. The apparatus of claim 32 wherein said gaseous fluid includes more than one component, said components being of different densities.

* * * * *